United States Patent [19]

Doolin et al.

[11] Patent Number: 5,431,540
[45] Date of Patent: Jul. 11, 1995

[54] MAIN ROTOR PITCH CONTROL ROD SUBASSEMBLY

[75] Inventors: Leonard J. Doolin, Southbury; Frank P. D'Anna, Seymour; Stephen V. Poulin, Stratford, all of Conn.

[73] Assignee: United Technologies Corporation, Hartford, Conn.

[21] Appl. No.: 166,764

[22] Filed: Dec. 14, 1993

[51] Int. Cl.⁶ ............................................. B64C 27/59
[52] U.S. Cl. .................................. 416/168 R; 74/586; 74/594
[58] Field of Search ............... 416/61, 168 R; 74/586, 74/594

[56] References Cited

U.S. PATENT DOCUMENTS

| | | | |
|---|---|---|---|
| 3,786,695 | 1/1974 | Barrett, Jr. | 74/586 |
| 4,111,068 | 9/1978 | Bonisch | 416/168 R |
| 4,184,384 | 1/1980 | Levine | 74/594 |
| 4,498,842 | 2/1985 | Fischer et al. | 416/168 R |
| 4,805,483 | 2/1989 | Beckmann et al. | 74/594 |

FOREIGN PATENT DOCUMENTS 2459543 7/1976 Germany ................... 416/168 R

*Primary Examiner*—Edward K. Look
*Assistant Examiner*—James A. Larson
*Attorney, Agent, or Firm*—Terrance J. Radke

[57] ABSTRACT

One embodiment of a main rotor pitch control rod subassembly includes an upper rod end segment having a bearing subassembly, a lower rod end segment having a bearing subassembly, an eccentric bushing disposed in rotatable combination with the upper rod end segment bearing subassembly for varying the axial length of the pitch control rod subassembly, a composite central body structure interposed between the upper and lower end segments, a composite strap member wrapped around and secured in combination with the lower end segment bearing subassembly, the composite central body structure, and the upper end segment bearing subassembly, eccentric bushing combination, a composite overwrap overlayed in combination with the composite strap member, a locking key member and a clamp-up bolt for clamping the composite strap member in tensioned combination with the locking key member, and a locking bolt. The eccentric bushing has a plurality of spaced apart bushing apertures formed therethrough, and the locking key member includes a clevis configuration having a plurality of spaced key apertures formed therethrough, interaction between the bushing and key apertures providing a fine, vernier-type adjustment capability. To vary the axial length of the pitch control rod subassembly, the eccentric bushing is rotated about the upper rod end segment bearing subassembly to a predetermined position wherein one of the bushing apertures aligns with one pair of the key apertures. The locking bolt is inserted through the aligned apertures to lock the eccentric bushing in the predetermined position.

23 Claims, 4 Drawing Sheets

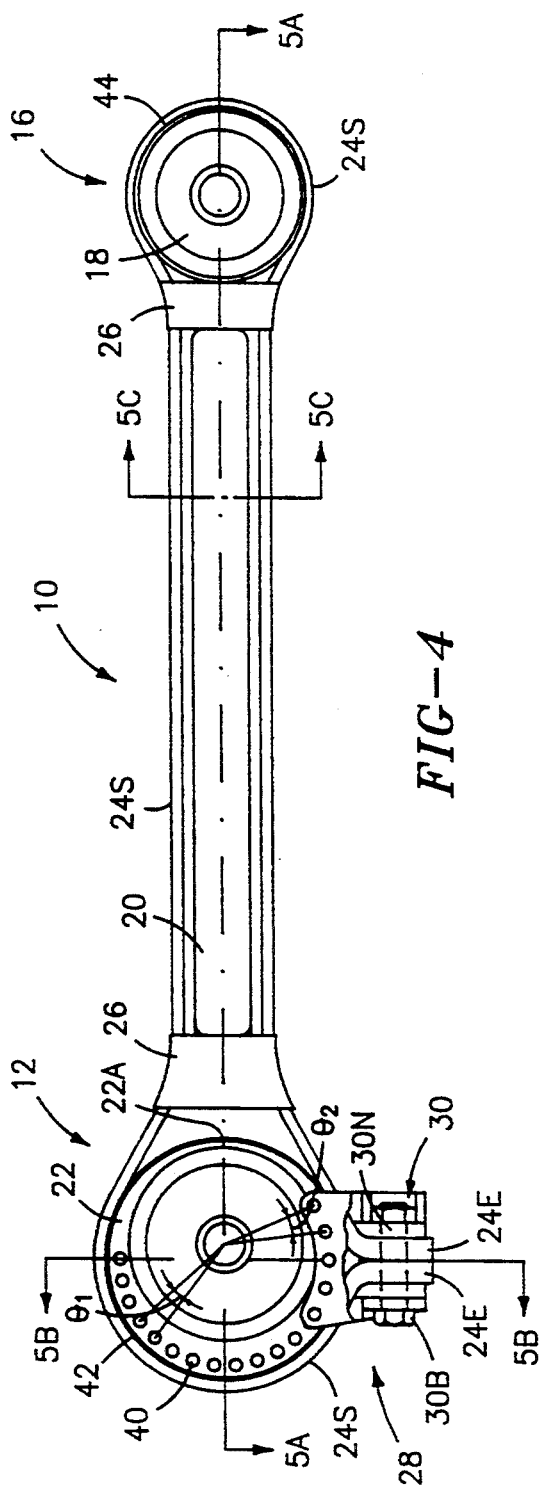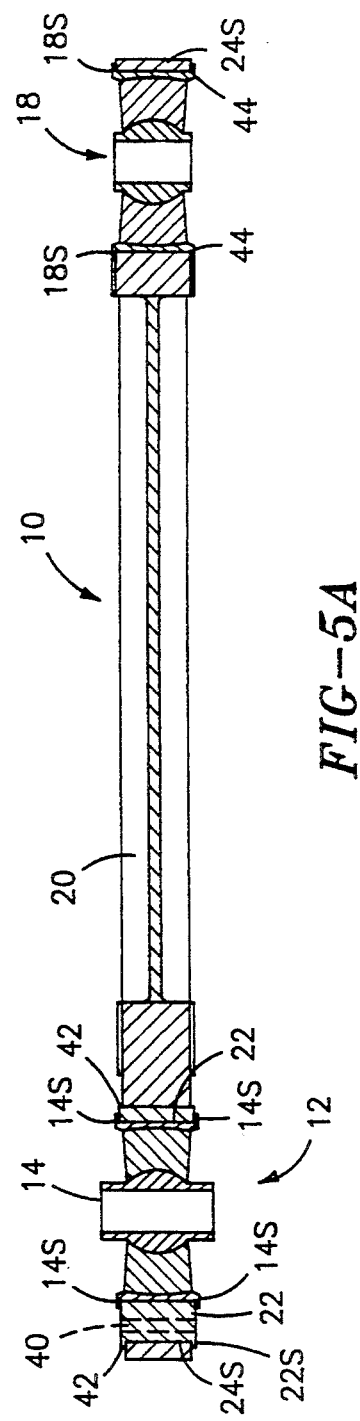

MAIN ROTOR PITCH CONTROL ROD SUBASSEMBLY

The Government has rights in this invention pursuant to Contract No. DAAJ09-91-C-A004 awarded by the Department of the Army.

TECHNICAL FIELD

The present invention is directed to main rotor pitch control rod subassemblies for a helicopter main rotor assembly, and more particularly to a main rotor pitch control rod subassembly having an eccentric bushing disposed in operative combination with one bearing subassembly of the pitch control rod subassembly for manually adjusting the axial length thereof to provide tracking correction for the corresponding main rotor blade.

Background of the Invention

A helicopter flight control system provides the functional means whereby the pilot controls the flight profile of the helicopter through collective and/or cyclic pitch inputs to change the pitch angle(s) of the main rotor blades. The typical helicopter flight control system is comprised of a plurality of interfacing mechanical/hydraulic elements, and the main rotor pitch control rod subassemblies are a critical element of the control system. Main rotor pitch control rod subassemblies must be designed to carry large vibratory axial loads and to be manually adjustable in length to provide tracking correction for the corresponding main rotor blade. In addition, for military applications the main rotor pitch control rod subassemblies must exhibit a high ballistic damage tolerance capability.

FIG. 1 illustrates an exemplary helicopter main rotor hub assembly 100 (for a UH-60A helicopter) that comprises a plurality of spindle subassemblies 102 that include cuffs for mechanically interconnecting the main rotor blades (not shown) to the main rotor hub assembly 100 and several of the interfacing mechanical elements comprising the helicopter flight control system. The interfacing hub elements include pitch horns or arms 104 disposed in combination with respective spindle subassemblies 102, a rotating swashplate 106, and a plurality of main rotor pitch control rod subassemblies 108. The main rotor pitch control rod subassemblies 108 function as mechanically adjustable tension/compression linkages that provide the mechanical interface between the rotating swashplate 106 and the corresponding pitch arms 104. Each main rotor pitch control rod subassembly 108 is mechanically adjustable in axial length to provide tracking correction for the corresponding main rotor blade. Adjusting the axial length of a main rotor pitch control rod subassembly 108 produces a change in the pitch angle of the corresponding main rotor blade, which causes the corresponding main rotor blade tip to move back into the tip path plane of the main rotor.

Collective and/or cyclic pitch inputs provided by the pilot are coupled through the interfacing mechanical/hydraulic elements of the helicopter flight control system to spatially displace, i.e., lower, raise, or tilt, the rotating swashplate 106. The spatial displacement of the rotating swashplate 106 causes linear displacements of the main rotor pitch control rod subassemblies 108 which are coupled through the respective pitch arms 104 to cause a rotational displacement of the spindle subassemblies 102 about the pitch axes of the respective main rotor blades. Rotational displacement of the main rotor blades about the respective pitch axes changes the pitch angle(s) of the main rotor blades to vary the flight profile, e.g., speed, pitch, roll, of the helicopter.

A prior art main rotor pitch control rod subassembly 108 of the type used in the main rotor hub assembly 100 described hereinabove is depicted in FIG. 2 and comprises an upper rod end portion 110 that includes a bearing subassembly 112, a lower rod end portion 114 that includes a bearing subassembly 116, a central body 118, i.e., a barrel, upper and lower jam nuts 120, 122, and a locking key 124 interposed between the barrel 118 and the upper jam nut 120. The upper and lower rod end portions 110, 114 further include tubular threaded portions 126, 128, respectively, having diametrical threads. For example, the upper tubular threaded portion 126 may have a left hand thread and the lower tubular threaded portion 128 may have a right hand thread or vice versa. The upper and lower rod end portions 110, 114 are configured to facilitate mechanical interconnection of the bearing assemblies 112, 116 with the corresponding pitch arm 104 and the rotating swashplate 106, respectively. For example, with reference to FIG. 1, the pitch arms 104 and the rotating swashplate 106 include clevis structures 104C, 106C, respectively, for mechanically interconnecting the bearing subassemblies 112, 116 of the upper and lower rod end portions 110, 114 thereto by bolted connections.

The upper jam nut 120 and the upper portion of the barrel 118 are internally threaded for threaded interaction with the upper tubular threaded portion 126 while the lower jam nut 122 and the lower portion of the barrel 118 are internally threaded for threaded interaction with the lower tubular threaded portion 128. To vary the axial length of the main rotor pitch control rod subassembly 108, i.e., to change the center-to-center axial separation distance between the upper and lower bearing subassemblies 112, 116, the upper and lower jam nuts 120, 122 are rotated to effect disengagement thereof from the barrel 118. The barrel 118 is then rotated clockwise or counterclockwise to increase or decrease the axial separation distance between the upper and lower bearing subassemblies 112, 116 (in a manner similar to the operation of a turnbuckle, rotation of the barrel 118 causes simultaneous axial translational movement of the upper and lower tubular threaded portions 126, 128) to provide tracking correction for the corresponding main rotor blade. As the barrel 118 is rotated, the locking key 124 engages castellations (not shown) in the upper tubular threaded portion 126 to provide an indication of the number of "clicks" of main rotor blade adjustment and to positively lock the upper rod end portion 110 and the barrel 118 in combination.

The upper and lower jam nuts 120, 122 are then counter-rotated to engage the barrel 118, rotation of the upper jam nut 120 also forcing the locking key 124 into engagement with the corresponding aligned castellation. The upper and lower jam nuts 120, 122 and the engaged locking key 124 provide a positive anti-rotation feature for the main rotor pitch control rod subassembly 108 to preclude induced changes in the axial length thereof due to the vibratory axial loads experienced during helicopter flight operations.

While the prior art main rotor pitch control rod subassembly 108 described hereinabove is functionally adequate as a mechanical interface element of the helicopter flight control system and for providing tracking correction for the corresponding main rotor blade through mechanical adjustment of the axial length thereof, the described main rotor pitch control rod subassembly 108 does have some inherent limitations. For example, the threaded components, i.e., the tubular threaded portions 126, 128 of the upper and lower rod end portions 110, 114, respectively, the barrel 118, and the upper and lower jam nuts 120, 122 are typically fabricated from a metallic material such as steel or titanium, which increases the overall weight of the helicopter flight control system. Main rotor pitch control rod subassemblies 108 are mechanically complex, which results in increased fiscal and labor expenditures in fabrication and assemblage thereof. Moreover, the mechanical complexity of the main rotor pitch control rod subassembly 108 makes axial adjustments thereof for main rotor blade tracking corrections relatively labor intensive and time consuming. Further, there is a flight safety concern in ensuring that the upper and lower jam nuts 120, 122 are properly re-torqued after axial adjustment of the pitch control rod subassembly 108 This concern leads to additional procedural steps, such as the installation of safety lock wires and a post adjustment inspection.

A need exists to provide a main rotor pitch control rod subassembly that is less mechanically complex and lighter than existing main rotor pitch control rod subassemblies. Such a main rotor pitch control rod subassembly should incorporate a relatively simple means for axial adjustment of the main rotor pitch control rod subassembly for main rotor blade tracking corrections.

SUMMARY OF THE INVENTION

One object of the present invention is to provide a main rotor pitch control rod subassembly that includes an eccentric bushing operatively disposed in combination with a bearing subassembly to vary the axial length of the pitch control rod subassembly.

Another object of the present invention is to provide a main rotor pitch control rod subassembly that includes an eccentric bushing having a plurality of spaced apart bushing apertures formed therethrough that is operatively disposed in combination with a bearing subassembly to vary the axial length of the pitch control rod subassembly and means for interacting with one of the bushing apertures to lock the eccentric bushing in a predetermined position after rotation thereof to vary the axial length of the pitch control rod.

A further object of the present invention is to provide a main rotor pitch control rod subassembly that includes an eccentric bushing having a plurality of spaced apart bushing apertures formed therethrough that is operatively disposed in combination with a bearing subassembly to vary the axial length of the pitch control rod subassembly and a key locking member having a plurality of key apertures formed therethrough that is operative for interacting with one of the bushing apertures to lock the eccentric bushing in a predetermined position after rotation thereof to vary the axial length of the pitch control rod and wherein the bushing and key apertures in interactive combination provide a vernier-type adjustment capability in axial length for the pitch control rod subassembly.

Still a further object of the present invention is to provide a main rotor pitch control rod subassembly having an eccentric bushing operatively disposed in combination with a bearing subassembly to vary the axial length of the pitch control rod subassembly that includes means for locking the bearing subassembly in position as the axial length of the pitch control rod subassembly is varied so that loads are not induced in the bearing subassembly.

Yet another object of the present invention is to provide a main rotor pitch control rod subassembly wherein selected components comprising the pitch control rod subassembly are fabricated from composite materials to reduce the overall weight of the pitch control rod subassembly.

These and other objects are achieved by one embodiment of a main rotor pitch control rod subassembly according to the present invention that includes an upper rod end segment having a bearing subassembly disposed in operative combination therewith, a lower rod end segment having a bearing subassembly operatively disposed in combination therewith, an eccentric bushing disposed in rotatable combination with one of the bearing subassemblies that is operative for varying the axial length of the pitch control rod subassembly, a central body structure interposed between the upper and lower rod end segments for reacting compressive loads of the pitch control rod subassembly, a strap member for defining the overall configuration of the pitch control rod subassembly and for reacting tension loads therein, an overwrap overlayed in combination with the strap member, a locking key member, and a locking bolt. The strap member may have a continuous configuration, i.e., a loop, or a split configuration, i.e., free ends. The eccentric bushing has a plurality of spaced apart bushing apertures formed therethrough, and the locking key member includes a clevis configuration having a plurality of key apertures formed therethrough such that interaction between the bushing and key apertures provides a fine, vernier-type adjustment capability for varying the axial length of the pitch control rod subassembly. To vary the axial length of the pitch control rod subassembly, the eccentric bushing is rotated about the corresponding bearing subassembly to a predetermined position wherein one of the bushing apertures aligns with one pair of the key apertures. The locking bolt is inserted through the aligned apertures to lock the eccentric bushing in the predetermined position. The pitch control rod subassembly may further include a bearing orientation member that interacts with the corresponding bearing subassembly to prevent any undesired torsional loading or positional change from being coupled into the bearing subassembly during rotation of the eccentric bushing for control rod length adjustment.

For the embodiments of the pitch control rod subassembly described herein, the central body structure, the strap member, and/or the overwrap are preferably formed from composite materials. The strap member is formed from unidirectional fibers impregnated within a resin matrix and is wrapped about and secured in combination with the bearing subassembly, eccentric bushing combination, the central body structure, and the other bearing subassembly. The free ends of the composite split-configuration strap member are clamped up in combination with the locking key member utilizing a clamp-up means. The central body structure may be formed from a matrix of fibrous material impregnated within a resin matrix, e.g., a sheet molding compound. The fibrous material forming the central body structure may be randomly orientated or may have an axial orientation, depending upon the magnitude of the compressive loads experienced by the pitch control rod subassembly. The overwrap is formed from wound composite filaments impregnated within a resin matrix, and in one described embodiment may comprise discrete cuffs overlayed in combination with the composite strap member or a single cuff extending between the bearing subassemblies in overlayed combination with the composite strap member. In another described embodiment, the locking key member functions as one discrete cuff for the rod end segment that includes the eccentric bushing, bearing subassembly combination.

BRIEF DESCRIPTION OF THE DRAWINGS

A more complete understanding of the present invention and the attendant features and advantages thereof may be had by reference to the following detailed description of the invention when considered in conjunction with the following drawings wherein:

FIG. 4 is a plan view of the main rotor pitch control rod subassembly of FIG. 3 (shown untwisted).

FIG. 5A is a cross-sectional view of the main rotor pitch control rod subassembly of FIG. 4 taken along line 5A—5A thereof.

DETAILED DESCRIPTION OF PREFERRED EMBODIMENTS

Figure 1:
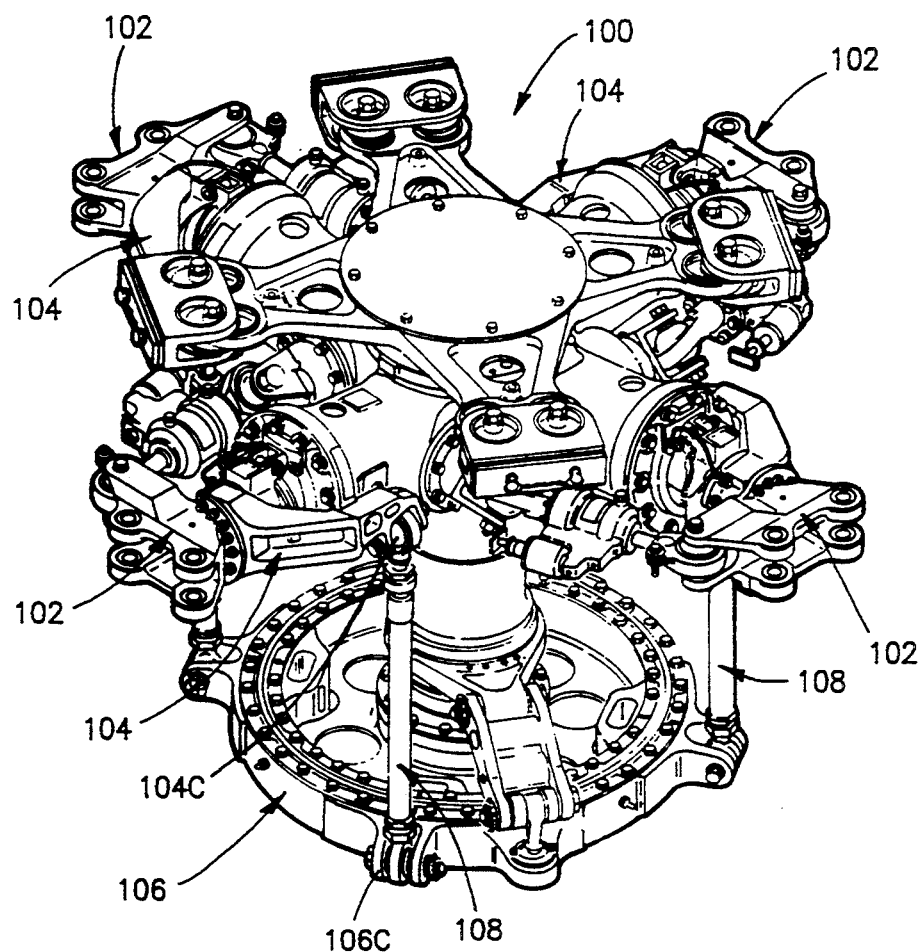
FIG. 1 is a perspective view of an exemplary helicopter main rotor hub assembly.
Figure 2:
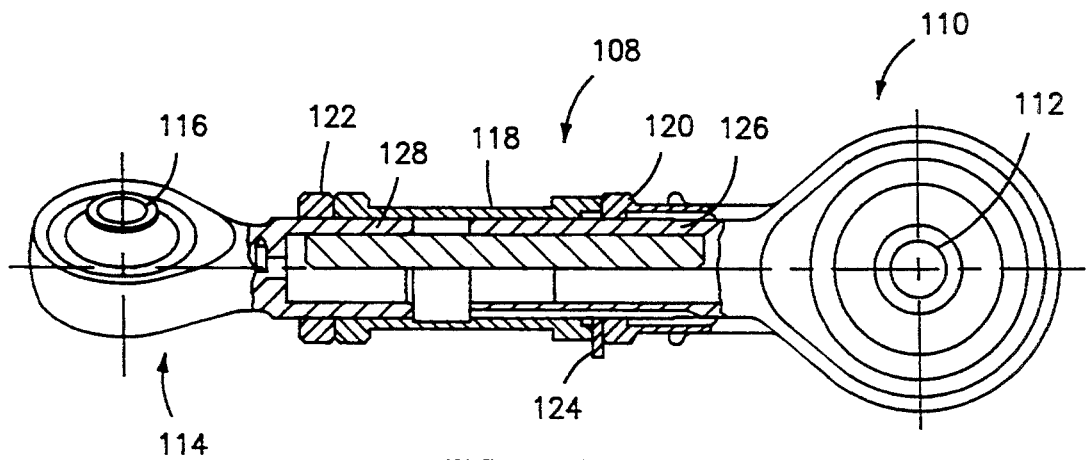
FIG. 2 is a partial cross-sectional view illustrating a prior art main rotor pitch control rod subassembly for the main rotor hub assembly of FIG. 1.
Figure 3:
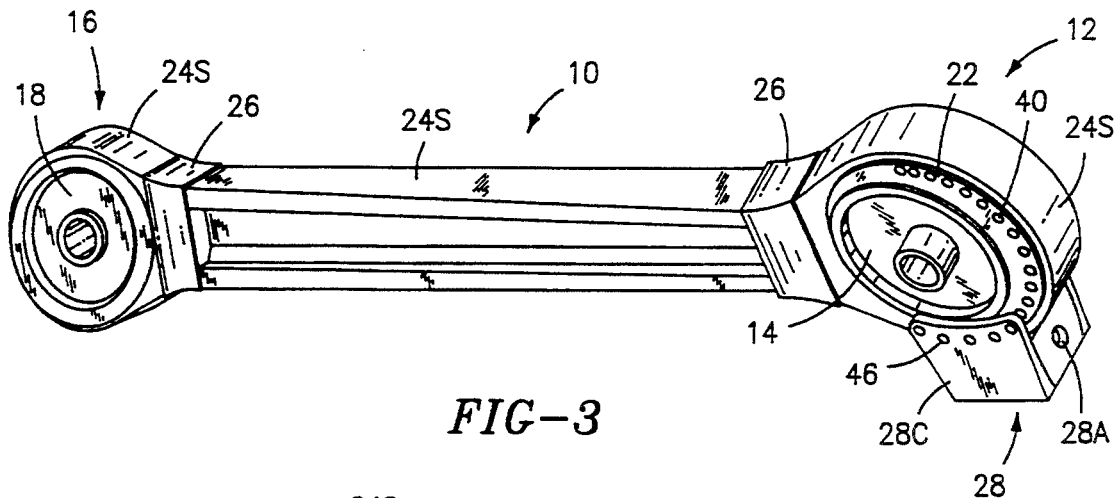
FIG. 3 is a perspective view of one exemplary embodiment of a main rotor pitch control rod subassembly according to the present invention.
Figures 5B, 5C:
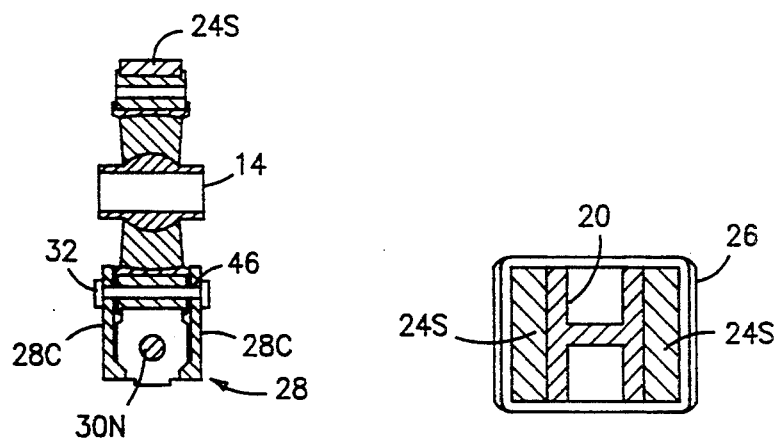
FIG. 5B is a cross-sectional view of the main rotor pitch control rod subassembly of FIG. 4 taken along line 5B—5B thereof.
FIG. 5C is a cross-sectional view of the main rotor pitch control rod subassembly of FIG. 4 taken along line 5C—5C thereof.

Referring now to the drawings wherein like reference characters identify corresponding or similar elements throughout the several views, FIGS. 3–5 illustrate one exemplary embodiment of a main rotor pitch control rod subassembly 10 according to the present invention. The pitch control rod subassembly 10 according to the present invention includes an eccentric bushing disposed in combination with a bearing subassembly for mechanically adjusting the axial length of the pitch control rod subassembly 10 that is mechanically less complex than a prior art main rotor pitch control rod subassembly of the type described hereinabove, and which effectively eliminates flight safety concerns of the type described hereinabove. Furthermore, the composite main rotor pitch control rod subassembly 10 eliminates the need for safety lock wires and a post adjustment inspection. In addition, the configuration of the eccentric bushing with respect to the bearing subassembly is such that the pitch radius arm, i.e., the radius from the blade pitch axis to the bearing subassembly, is held constant. Selected elements comprising the pitch control rod subassembly 10 are preferably fabricated from composite materials such that the weight of the pitch control rod subassembly 10 is less than a prior art main rotor pitch control rod subassembly of the type described hereinabove (a projected weight reduction of about twenty-five percent may be attained). In addition to providing weight savings, the use of composite materials to form the pitch control rod subassembly 10 provides an additional advantage in inhibiting crack propagation and in providing a visual inspection advantage (cracks in composites may be readily observed during maintenance inspections).

The described embodiment of the main rotor pitch control rod subassembly 10 according to the present invention illustrated in FIGS. 3–5 comprises an upper rod end segment 12 that includes a bearing subassembly 14 operatively disposed in combination therewith, a lower rod end segment 16 that includes a bearing subassembly 18 operatively disposed in combination therewith, a central body structure 20, an eccentric bushing 22, a strap member 24S having a split strap configuration, an overwrap 26, a locking key member 28, a clamp-up means 30, and a locking bolt 32. The upper and lower rod end segments 12, 16 are configured to facilitate mechanical interconnection of the main rotor pitch control rod subassembly 10 with the respective pitch arm and rotating swashplate of a main rotor hub assembly as described hereinabove. The bearing subassemblies 14, 18 of the upper and lower rod end segments 12, 16 are operative to accommodate displacements induced in the pitch control rod subassembly 10 during operation of the helicopter main rotor assembly. The bearing subassemblies 14, 18 are preferably elastomeric or self-lubricating Spherical bearings of the type known in the art. For the described embodiment, the bearing subassemblies 14, 18 include shoulders 14S, 18S for engaging the eccentric bushing 22 and the strap member 24S, respectively (see FIG. 5A).

The central body structure 20 is interposed between the upper and lower rod end segments 12, 16, and is operative to react the compressive loads exerted upon the pitch control rod subassembly 10 and satisfies cross-sectional design constraints by precluding buckling of the pitch control rod subassembly 10 in compression. The central body structure 20 is preferably fabricated from composite material such as a fibrous material impregnated within a resin matrix, e.g., a sheet molding compound (SMC). The fibrous elements in the matrix may be randomly orientated or may have a preferential strength in the axial direction by alignment of the fibrous elements with the axis of the pitch control rod subassembly 10, depending upon the magnitude of the loads experienced by the pitch control rod subassembly 10. For the embodiment of the pitch control rod subassembly 10 illustrated in FIGS. 3–5, the central body structure 20 has an "I-beam" configuration (see FIG. 5C). One skilled in the art will appreciate, however, that other configurations may be used, e.g., box beam, solid rectangular, depending upon the magnitude of the loads experienced by the pitch control rod subassembly 10.

The eccentric bushing 22 provides the means for mechanically adjusting the axial length, i.e., the center-to-center axial separation distance between the upper and lower bearing subassemblies 14, 18, of the pitch control rod subassembly 10. The eccentric bushing 22 may be fabricated from a metallic or composite material, depending upon the magnitude of the loads experienced by the pitch control rod subassembly 10. The eccentric bushing 22 may be disposed in operative combination with the bearing subassembly of the upper rod end segment 12 or the lower rod end segment 16. Rotation of the eccentric bushing 22 with respect to the opposite bearing subassembly 14 or 18 causes a change in the axial length of the pitch control rod subassembly 10 (either an increase or decrease depending upon the starting position of the eccentric bushing 22 and the direction of rotation). For the exemplary embodiment illustrated in FIGS. 3–5 and described herein, the eccentric bushing 22 is disposed in combination with the upper bearing subassembly 14. The eccentric bushing 22 has a split configuration (see reference character 22A in FIG. 4) to facilitate clamp-up of the eccentric bushing 22 in operative combination with the bearing subassembly 14. The eccentric bushing 22 further includes a shoulder 22S for engaging the strap member 24S (see FIG. 5A).

The eccentric bushing 22 has a plurality of spaced apart bushing apertures 40 formed therethrough. Each bushing aperture 40 is preferably equidistantly spaced apart from adjacent bushing apertures 40 by a predetermined arc angle $\theta_1$ (as measured with respect to the axis of the bearing subassembly 14 for the described embodiment). The gradations of incremental axial adjustment that may be effectuated by rotation of the eccentric bushing 22 is determined, in part, by the magnitude of the arc angle $\theta_1$. The magnitude of the arc angle $\theta_1$ between adjacent bushing apertures 40 for the embodiment of FIGS. 3–5 is 12°.

The strap member 24S of the main rotor pitch control rod subassembly 10 is operative to react the tension loads experienced thereby. The strap member 24S is preferably fabricated from a composite material, i.e., unidirectional fibers such as graphite fibers, fiberglass fibers, and/or aromatic polyamide fibers impregnated within a resin matrix. The unidirectional fibers are aligned along the length axis of the strap member 24S to provide the tension reaction capability thereof. The strap member 24S defines the configuration of the upper and lower rod end segments 12, 16 of the pitch control rod subassembly 10.

For the embodiment of the pitch control rod subassembly 10 described in conjunction with FIGS. 3–5, the strap member 24S has a split configuration defined by free ends 24E, and is wrapped around and secured in combination with the central body structure 20, the bearing subassembly 18, and the eccentric bushing 22, bearing subassembly 14, combination to define the configuration of the pitch control rod subassembly 10, i.e., the upper and lower rod end segments 12, 16 having the central body structure 20 interposed therebetween. The strap member 24S is secured in fixed combination with the central body structure 20 by a known technique, e.g., bonding or co-curing, and is secured in fixed combination with the bearing subassembly 18 by a known technique, e.g., bonding or snap rings. The eccentric bushing 22 of the bearing subassembly 14, eccentric bushing 22 combination, however, must be rotatable with respect to the bearing subassembly 14. Therefore, an intermediate structure such as a sleeve or snap ring must be utilized to secure the bearing subassembly 14, eccentric bushing 22 combination in fixed combination with the strap member 24S (see FIGS. 4, 5A wherein the exemplary embodiment of the pitch control rod subassembly 10 described herein utilizes snap rings identified by the reference characters 42, 44 which mechanically interact with the shoulder 22S and the shoulder 18S, respectively).

The free ends 24E of the wrapped strap member 24S are tensioned and clamped in combination in the locking key member 28 utilizing the clamp-up means 30 (see FIG. 4 wherein the clamp-up means 30 comprises a bolt 30B threaded in combination with a captured nut 30N). The clamp-up means 30 is disengageable to release the free ends 24E in the locking key member 28 to relax the tension exerted by the strap member 24S. With the strap member 24S in an untensioned condition, axial adjustment of the pitch control rod subassembly 10 may be effectuated by rotation of the eccentric bushing 22.

The overwrap 26 overlays the strap member 24S as illustrated in FIGS. 3, 4. For the described embodiment illustrated in FIGS. 3, 4, the overwrap 26 comprises discrete composite cuffs superposed over the ends of the central body structure 20. The overwrap 26 may also comprise discrete composite cuffs having greater axial lengths or a full composite cuff that extends in length between the ends of the central body structure 20. The particular configuration of the overwrap 26 depends upon the magnitude of the loading experienced by the strap member 24S as described in the following paragraph. The overwrap 26 is preferably formed from a composite material, e.g., graphite fibers, fiberglass fibers, and/or aromatic polyamide fibers impregnated within a resin matrix. Preferably, the overwrap 26 is formed by winding composite filaments about the strap member 24S. One skilled in the art will appreciate that the overwrap 26 may also be formed utilizing composite plies of unidirectional fibers.

The overwrap 26 is operative to counteract the "kick-loads" of the strap member 24S. That is, when the strap member 24S is tensioned, it has a tendency to bow outwardly between the spaced apart bearing subassemblies 14, 18, i.e., to assume a straight line therebetween. The overwrap 26 maintains the strap member 24S in physical engagement over a larger sector of each bearing subassembly 14 or 18 than would normally occur if the "kick-loads" were not counteracted. In addition, as the strap member 24S is tensioned, the upper and lower rod end segments 12, 16 tend to align in the same plane. With reference to FIG. 3, the spatial orientation of the upper and lower rod end segments 12, 16 when disposed in combination with the respective elements of the main rotor hub assembly is such that the medial planes of the upper and lower rod end segments 12, 16 are offset, i.e., do not lie in a common plane. A full overwrap 26 (or two discrete composite cuffs which in combination have an axial length that is somewhat less than the length of the full overwrap 26) functions to preclude the tendency towards medial plane alignment of the upper and lower rod end segments 12, 16.

The locking key member 28 is operative to facilitate clamp up of the free ends 24E of the strap member 24S. The locking key member 28 has a generally box-like configuration that accommodates the free ends 24E of the strap member 24S and the clamp-up means 30 (see reference numeral 28A in FIG. 3 which identifies a clamp aperture formed in one sidewall of the locking key member 28 for insertion of the clamp-up bolt 30B to threadingly engage the captured nut 30N) in clamped combination.

In addition, the locking key member 28, in combination with the locking bolt 32, is operative to lock the eccentric bushing 22 in a predetermined position, and provides, in combination with the eccentric bushing 22, a vernier-type adjustment capability for the pitch control rod subassembly 10 according to the present invention. The opposed sidewalls 28C (see FIGS. 3, 5B) of the locking key member 28 define a clevis configuration, each sidewall 28C having a plurality of key apertures 46 formed therethrough as illustrated in FIGS. 3, 4. The key apertures 46 may be evenly or unevenly spaced apart, but are preferably evenly spaced apart by a predetermined arc angle $\theta_2$ (measured with respect to the bearing assembly 14 axis). For the illustrated embodiment, the key apertures 46 are spaced apart by a predetermined arc angle $\theta_2$ of 10°. The opposed sidewalls 28C are superposed in combination with the eccentric bushing 22 such that the corresponding key apertures 46 thereof are aligned.

As the eccentric bushing 22 is rotated through each spacing defined by the predetermined arc angle $\theta_1$, each pair of aligned key apertures 46 will at one point be aligned with a bushing aperture 40. The spacing between the key apertures 46, in combination with the spacing between the bushing apertures 40, facilitates fine incremental adjustments in the axial length of the pitch control rod subassembly 10 according to the present invention. For the described 12° spacing between adjacent bushing apertures 40 as described hereinabove, the five key apertures 46 having a 10° spacing therebetween illustrated in FIG. 3 facilitate incremental adjustments of 2°.

The locking bolt 32 (see FIG. 5B) is operative to lock the eccentric bushing 22 in a predetermined position when inserted through the bushing aperture 40 and key apertures 46 in aligned combination. The locking bolt 32 also functions as a redundant safety feature of the pitch control rod subassembly 10 by holding the free ends 24E of the strap member 24S in the locking key member 28 in the event of a failure of the clamp-up means 30.

To adjust an out-of-track rotor blade utilizing the pitch control rod subassembly 10 according to the present invention, the axial length, i.e., center-to-center separation distance between the bearing subassemblies 14, 18, of the corresponding pitch control rod subassembly 10 is adjusted to vary the baseline pitch of the out-of-track rotor blade to change the plane of rotation of the tip thereof. First, the clamp-up means 30 is disengaged to loosen the free ends 24E of the strap member 24S, thereby reducing the tension exerted by the strap member 24S on the eccentric bushing 22. Next, the locking bolt 32 is removed from the aligned bushing aperture 40, key apertures 46 combination. The axial length of the pitch control rod subassembly 10 is then varied by rotating the eccentric bushing 22 a predetermined amount (as determined using a conventional blade tracking technique which indicates the degree to which the affected main rotor blade is out-of-track and the magnitude of pitch change required to correct the condition, i.e., return the rotating blade tip to the tip path plane of the main rotor) in a clockwise or counterclockwise direction to increase or decrease the center-to-center spacing between the bearing subassemblies 14, 18 a predetermined amount, i.e., to vary the axial length of the pitch control rod subassembly 10. The locking bolt 32 is then reinstalled in the newly aligned bushing aperture 40, key apertures 46 combination to lock the eccentric bushing 22 in the new position. Finally, the free ends 24E of the strap member 24S are retensioned and the clamp-up means 30 reengaged.

Figure 6:
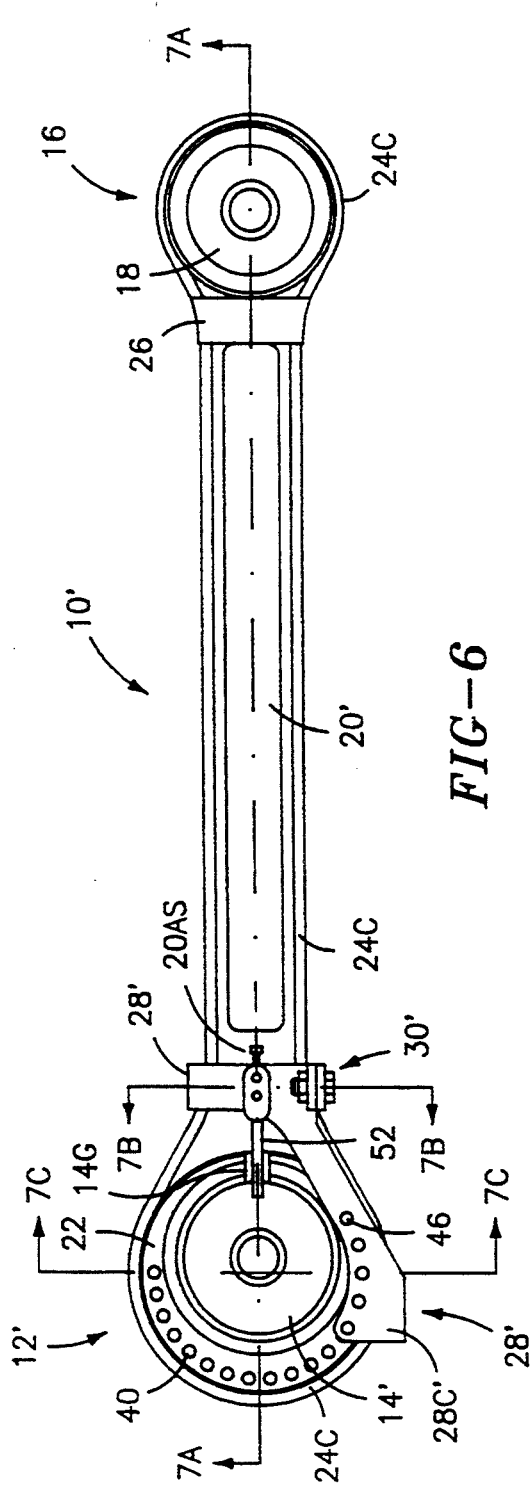
FIG. 6 is a plan view of another exemplary embodiment of a main rotor pitch control rod subassembly according to the present invention.

Another embodiment of a main rotor pitch control rod subassembly 10' according to the present invention is illustrated in FIGS. 6-7. The structural configuration and functional features of the pitch control rod subassembly 10' are as described hereinabove for the pitch control rod subassembly 10, except as described in the following paragraphs.

The upper rod end segment 12' includes a bearing subassembly 14' having the eccentric bushing 22 disposed in operative combination therewith. The bearing subassembly 14' includes an indexing groove 14G formed in the outer race of the bearing subassembly 14' as illustrated in FIG. 6. The indexing groove 14G is aligned with the longitudinal axis of the pitch control rod subassembly 10'. The central body structure 20' has an axial slot 20AS formed in the end portion thereof adjacent the upper rod end segment 12' as illustrated in FIGS. 6, 7A. The strap member 24C for the pitch control rod subassembly 10' has a continuous configuration, i.e., no free ends, and is preferably fabricated from composite material, i.e., unidirectional fibers impregnated within a resin matrix. The continuous strap member 24C provides a fail safety feature inasmuch as there is no break in the unidirectional fibers forming the strap member 24C.

Figures 7B, 7C:
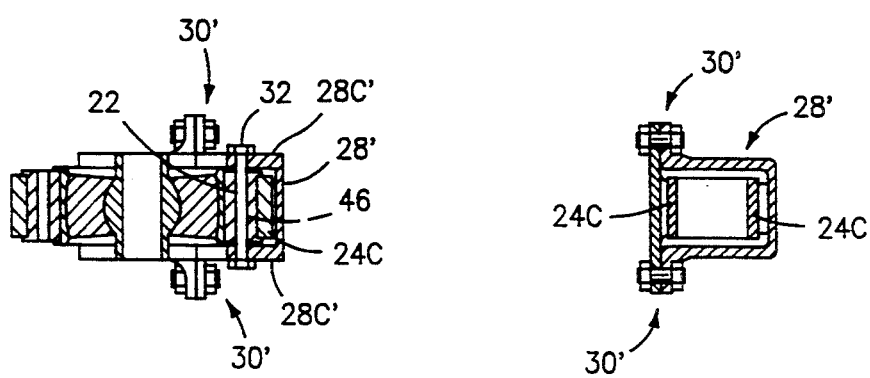
FIG. 7B is a cross-sectional view of the main rotor pitch control rod subassembly of FIG. 6 taken along line 7B—7B thereof.
FIG. 7C is a cross-sectional view of the main rotor pitch control rod subassembly of FIG. 6 taken along line 7C—7C thereof.
Figure 7A:
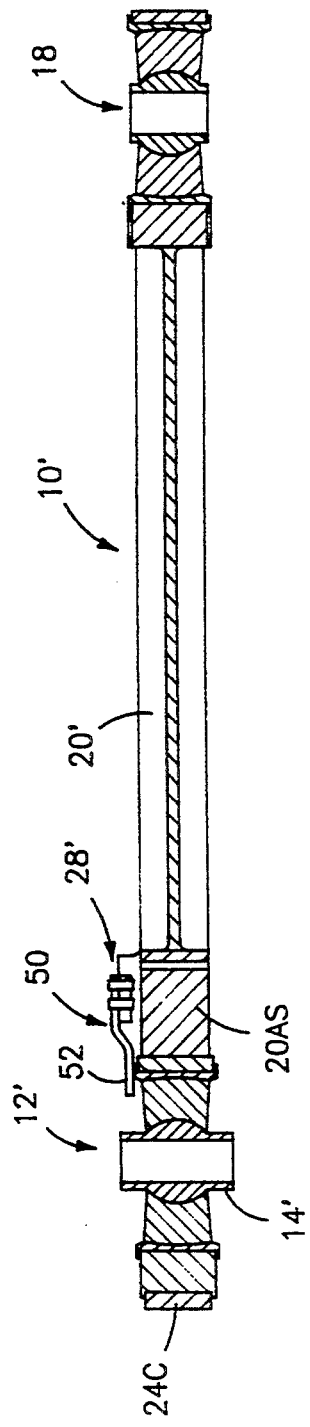
FIG. 7A is a cross-sectional view of the main rotor pitch control rod subassembly of FIG. 6 taken along line 7A—7A thereof.

The locking key member 28' for the pitch control rod subassembly 10' has a configuration as illustrated in FIGS. 6-7. The body of the locking key member 28' is operative to counteract the "kick-loads" of the strap member 24C at the upper rod end segment 12', i.e., the locking key member 28' functions as a discrete cuff. The clamp-up means 30' for the pitch control rod subassembly 10' comprises upper and lower bolted connections (see FIGS. 7B, 7C) that clamp the strap member 24C in tensioned combination with the locking key member 28' and the end portion of the central body member 20' proximal the upper rod end segment 12'. The axial slot 20AS provides transverse compliance in the central body structure 20' to facilitate tensioning of the strap member 24C. The locking key member 28' has sidewalls 28C' having a C-shaped configuration that project outwardly from body to partially envelop the strap member 24C and the eccentric bushing 22 (see FIG. 7C). The upper and lower, i.e., opposed, sidewalls 28C' have key apertures 46 formed therethrough and are superposed in combination with the eccentric bushing 22 such that the corresponding key apertures 46 thereof are aligned.

The pitch control rod subassembly 10' includes a bearing orientation member 50 that is mounted in combination with the locking key member 28' (see FIG. 7A). The bearing orientation member 50 includes a tang 52 that is sized to engage the indexing groove 14G. The bearing orientation member 50 is mounted in combination with the locking key member 28' so that the tang 52 engages the indexing groove 14G of the bearing subassembly 14'. The engaged bearing orientation member 50 prevents rotation from being induced in the bearing subassembly 14' during axial adjustment of the pitch control rod subassembly 10. That is, the rotational movement of the eccentric bushing 22 is not coupled into the bearing subassembly 14'. In addition, the engaged bearing orientation member 50 permits axial movement of the bearing during adjustment of the eccentric bushing 22, while limiting the rotational movement of the outer race of the bearing subassembly 14'.

Once the axial adjustment of the pitch control rod subassembly 10' is completed, the locking bolt 32 is inserted through the bushing aperture 40 and key apertures 46 in aligned combination to complete the axial adjustment of the pitch control rod subassembly 10'.

The procedure for adjusting an out-of-track rotor blade utilizing the pitch control rod subassembly 10' described in the preceding paragraphs incorporates the adjustment steps described for the pitch control rod subassembly 10 hereinabove. The steps relating to the bearing orientation member 50 are accomplished after the locking key 32 has been removed from the aligned bushing aperture 40, key apertures 46 combination.

The embodiments of the pitch control rod subassembly 10, 10' described hereinabove are less complex than prior art pitch control rods inasmuch as the use of the eccentric bushing 22 reduces the complexity of the pitch control rod subassembly 10, 10' by eliminating the use of jam nuts, threaded elements, a lock key, and safety lock wires and simplifies the manual operations required to vary the axial length of the pitch control rod subassembly 10, 10'. The pitch control rod subassemblies 10, 10' are lighter in weight than conventional main rotor pitch control rod subassemblies due to the use of composite materials as described hereinabove.

A variety of modifications and variations of the present invention are possible in light of the above teachings. It is therefore to be understood that, within the scope of the appended claims, the present invention may be practiced otherwise than as specifically described hereinabove.

What is claimed is:

1. A pitch control rod subassembly for a helicopter rotor hub assembly that includes a rotating swashplate and a pitch arm, comprising:
   upper and lower rod end segments;
   first and second bearing subassembly means for accommodating displacements induced in said pitch control rod subassembly during operation of the helicopter rotor hub assembly, said first bearing subassembly means being operatively disposed in combination with said upper rod end segment and the pitch arm and said second bearing subassembly means being operatively disposed in combination with said lower rod end segment and the rotating swashplate;
   central body structure means interposed between said first and second bearing subassembly means for reacting compressive loads exerted on said pitch control rod subassembly and for precluding buckling of said pitch control rod subassembly in compression;
   strap member means for reacting tension loads exerted on said pitch control rod subassembly and for defining the configuration of said upper and lower rod end segments of said pitch control rod subassembly;
   eccentric bushing means disposed in rotatable combination with one of said first and second bearing subassembly means for varying the axial length of said pitch control rod subassembly by rotation of said eccentric bushing means, said eccentric bushing means having a plurality of bushing apertures formed therethrough; and
   means for interacting with one of said bushing apertures of said eccentric bushing means to lock said eccentric bushing means in a predetermined position after rotation of said eccentric bushing means to vary the axial length of said pitch control rod subassembly.

2. The pitch control rod subassembly of claim 1 further comprising means for locking said one of said first and second bearing subassembly means in position during rotation of said eccentric bushing means.

3. The pitch control rod subassembly of claim 1 further comprising composite overwrap means disposed in overlayed combination with said strap member means for accommodating kick-loads in said strap member.

4. The pitch control rod subassembly of claim 1 wherein said eccentric bushing means is rotatably disposed in combination with said first bearing subassembly means.

5. The pitch control rod subassembly of claim 4 wherein said strap member means comprises a composite strap member formed from unidirectional fibers impregnated within a resin matrix and having free ends, said composite strap member being wrapped around and secured in combination with said eccentric bushing means, said central body structure means, and said second bearing subassembly means to define the configuration of said upper and lower rod end segments of said pitch control rod subassembly.

6. The pitch control rod subassembly of claim 5 wherein said interacting means comprises:
   a locking key member configured to accommodate said free ends of said composite strap member; and
   clamp up means disposed in combination with said locking key member and said free ends of said composite strap member for clamping said free ends in combination with said locking key member.

7. The pitch control rod subassembly of claim 6 wherein said interacting means further comprises a locking bolt and wherein said locking key member includes opposed sidewalls having a plurality of key apertures formed therethrough, said opposed sidewalls having a clevis configuration superposed in combination with said eccentric bushing means wherein said locking bolt is inserted through said bushing aperture and said key apertures in alignment to lock said eccentric bushing means in said predetermined position after rotation of said eccentric bushing means to vary the axial length of said pitch control rod subassembly.

8. The pitch control rod subassembly of claim 3 wherein said composite overwrap means comprises first and second composite cuffs formed from wound filaments impregnated within a resin matrix, said first and second composite cuffs being overlayed over opposed ends of said central body structure means.

9. The pitch control rod subassembly of claim 3 wherein said composite overwrap means comprises a full composite overwrap formed from wound filaments impregnated within a resin matrix overlaying said central body structure means.

10. The pitch control rod subassembly of claim 4 wherein said strap member means comprises a composite strap member formed from unidirectional fibers impregnated within a resin matrix and having a continuous loop configuration, said composite strap member being wrapped around and secured in combination with said eccentric bushing means, said central body structure means, and said second bearing subassembly means to define the configuration of said upper and lower rod end segments of said pitch control rod subassembly.

11. The pitch control rod subassembly of claim 10 further comprising a composite overwrap means disposed in overlayed combination with said composite strap member adjacent said second bearing subassembly means for accommodating kick-loads in said composite strap member; and wherein said interacting means comprises:

a locking key member disposed in overlayed combination with said composite strap member adjacent said first bearing means for accommodating kick-loads in said composite strap member; and clamp up means disposed in combination with said locking key member and said free ends of said composite strap member for clamping said composite strap member in tensioned combination with said locking key member.

12. The pitch control rod subassembly of claim 11 wherein said central body structure means has an axial slot formed therein at the end thereof adjacent said locking key member to provide transverse compliance in said central body structure means to facilitate clamping of said composite strap member in tensioned combination with said locking key member.

13. A pitch control rod subassembly for a helicopter main rotor hub assembly that includes a rotating swashplate and a pitch arm, comprising:

an upper rod end segment including a bearing subassembly;

a lower rod end segment including a bearing subassembly;

a central body structure interposed between said bearing subassemblies of said upper and lower rod end segments;

an eccentric bushing having a plurality of spaced apart bushing apertures formed therethrough mounted in rotatable combination with one of said bearing subassemblies;

a strap member wrapped around and secured in combination with said eccentric bushing, bearing subassembly combination, said central body structure, and said other bearing subassembly;

an overwrap member overlayed in combination with said strap member; and locking key member means for clamping up said strap member wherein said strap member is place in tension, said locking key member means further including means for interacting with one of said plurality of bushing apertures to lack said eccentric bushing in a predetermined position after rotation of said eccentric bushing to vary the axial length of said pitch control rod subassembly.

14. The pitch control rod subassembly of claim 13 further comprising means for locking said one of said bearing subassemblies in position during rotation of said eccentric bushing.

15. The pitch control rod subassembly of claim 13 wherein said interacting means comprises:

a locking bolt; and opposed sidewalls having a plurality of key apertures formed therethrough, said opposed sidewalls having a clevis configuration superposed in combination with said eccentric bushing wherein said locking bolt is inserted through said bushing aperture and said key apertures in alignment to lock said eccentric bushing in said predetermined position after rotation of said eccentric bushing to vary the axial length of said pitch control rod subassembly.

16. The pitch control rod subassembly of claim 13 wherein said strap member has a split configuration having free ends, and wherein said locking key member means comprises:

a locking key member having a configuration wherein said free ends of said strap member are insertable therein; and clamp-up means configured for insertion in said locking key member for clamping said free ends of said strap member in combination with said locking key member.

17. The pitch control rod subassembly of claim 13 wherein said strap member is a composite strap member formed from unidirectional fibers impregnated within a resin matrix.

18. The pitch control rod subassembly of claim 13 wherein said central body structure is a composite central body structure formed from a fibrous material impregnated within a resin matrix.

19. The pitch control rod subassembly of claim 13 wherein said overwrap comprises first and second composite cuffs formed from wound filaments impregnated within a resin matrix, said first and second composite cuffs being overlayed over opposed ends of said central body structure means.

20. The pitch control rod subassembly of claim 13 wherein said overwrap is formed from wound filaments impregnated within a resin matrix to overlay the entire length of said central body structure.

21. A pitch control rod subassembly for a helicopter hub assembly that includes a rotating swashplate and a pitch arm, comprising:

an upper rod end segment including a bearing subassembly;

an eccentric bushing having a plurality of bushing apertures formed therethrough mounted in rotatable combination with said bearing subassembly of said upper rod end segment;

a lower rod end segment including a bearing subassembly;

a composite central body structure interposed between said bearing subassemblies of said upper and lower rod end segments;

a composite strap member wrapped around and secured in combination with said eccentric bushing, bearing subassembly combination, said composite central body structure, and said bearing subassembly of said lower rod end segment;

a composite overwrap overlayed in combination with said composite strap member;

a locking key member configured to interact with said composite strap member for tensioning thereof, said locking key member including opposed sidewalls having a plurality of key apertures formed therethrough, said opposed sidewalls having a clevis configuration superposed in combination with said eccentric bushing;

clamp-up means for clamping said composite strap member in tensioned combination with said locking key member; and a locking bolt;

said eccentric bushing being rotatably about said upper rod end segment bearing subassembly to a predetermined position to vary the axial length of said pitch control rod subassembly, rotation of said eccentric bushing to said predetermined position causing one of said bushing apertures to align with one pair of said key apertures;

said locking bolt being inserted through said bushing aperture and said one pair of said key apertures in alignment to lock said eccentric bushing in said predetermined position after rotation of said eccentric bushing to vary the axial length of said pitch control rod subassembly.

22. The pitch control rod subassembly of claim 21 further comprising means for locking said bearing subassembly of said upper rod end segment in position during rotation of said eccentric bushing.

23. The pitch control rod subassembly of claim 22 wherein said composite central body structure has an axial slot formed in the end thereof adjacent said upper rod end segment to provide transverse compliance in said composite central body structure to facilitate clamping of said composite strap member in tensioned combination with said locking key member.

* * * * *